(12) United States Patent
Paul et al.

(10) Patent No.: US 10,048,715 B2
(45) Date of Patent: Aug. 14, 2018

(54) ELECTRONIC DEVICE POWER PROTECTION CIRCUITRY

(71) Applicant: Apple Inc., Cupertino, CA (US)

(72) Inventors: Rajarshi Paul, San Jose, CA (US); Yehonatan Perez, Menlo Park, CA (US); Stephen J. Hrinya, San Jose, CA (US); Eugene L. Shoykhet, San Jose, CA (US)

(73) Assignee: Apple Inc., Cupertino, CA (US)

(*) Notice: Subject to any disclaimer, the term of this patent is extended or adjusted under 35 U.S.C. 154(b) by 77 days.

(21) Appl. No.: 15/143,321

(22) Filed: Apr. 29, 2016

(65) Prior Publication Data

US 2016/0320788 A1 Nov. 3, 2016

Related U.S. Application Data

(63) Continuation of application No. 13/629,276, filed on Sep. 27, 2012, now Pat. No. 9,329,697.

(Continued)

(51) Int. Cl.
*G05F 3/02* (2006.01)
*G06F 3/02* (2006.01)
(Continued)

(52) U.S. Cl.
CPC .............. *G05F 3/02* (2013.01); *G06F 3/02* (2013.01); *H02H 3/18* (2013.01); *H02H 7/20* (2013.01); *H02H 9/025* (2013.01); *H04W 88/02* (2013.01)

(58) Field of Classification Search
CPC .... G05F 3/02; G06F 3/02; H02H 3/18; H02H 7/20; H02H 9/025; H04W 88/02
(Continued)

(56) References Cited

U.S. PATENT DOCUMENTS

| 5,532,623 A | 7/1996 | Advani et al. |
| 6,577,110 B2 | 6/2003 | Van Auken |

(Continued)

FOREIGN PATENT DOCUMENTS

| CN | 1684351 | 10/2005 |
| JP | 2002-335626 | 11/2002 |

(Continued)

*Primary Examiner* — Hal Kaplan
(74) *Attorney, Agent, or Firm* — Treyz Law Group, P.C.; G. Victor Treyz; Vineet Dixit (57) ABSTRACT

A host electronic device may be coupled to an accessory electronic device. During normal operation, the host device may supply the accessory device with power over a power supply line. Back-powering events in which the accessory device delivers power to the host device may be prevented by interposing a protection transistor in the power supply line. A current mirror may be formed using the protection transistor and an additional transistor that produces a sense current proportional to the amount of current that is flowing through the power supply line. A current-to-voltage amplifier may produce a sense voltage that is proportional to the sense current. A bias circuit may be used to bias the sense current through the current mirror. A control circuit may compare the sense voltage to one or more reference voltages and turn off the protection transistor when appropriate to prevent back-powering of the host device.

20 Claims, 11 Drawing Sheets

Related U.S. Application Data (60) Provisional application No. 61/664,691, filed on Jun. 26, 2012, provisional application No. 61/660,634, filed on Jun. 15, 2012.

(51) Int. Cl.
*H02H 3/18* (2006.01)
*H02H 7/20* (2006.01)
*H04W 88/02* (2009.01)
*H02H 9/02* (2006.01)

(58) Field of Classification Search
USPC ............................................. 307/127
See application file for complete search history.

(56) References Cited

U.S. PATENT DOCUMENTS

| | | | |
|---|---|---|---|
| 7,054,622 B2 * | 5/2006 | Wang | G06F 8/65 455/418 |
| 7,132,848 B2 | 11/2006 | Lai | |
| 7,548,403 B2 | 6/2009 | Nagata et al. | |
| 8,278,893 B2 | 10/2012 | Motz | |
| 2002/0063573 A1 | 5/2002 | Genova et al. | |
| 2002/0167771 A1 | 11/2002 | Kamiya | |
| 2007/0171590 A1 | 7/2007 | Nagata et al. | |
| 2008/0204958 A1 | 8/2008 | Shearon et al. | |
| 2010/0317401 A1 * | 12/2010 | Lee | G06F 17/30575 455/557 |
| 2011/0115556 A1 | 5/2011 | May | |
| 2012/0268705 A1 | 10/2012 | Wolf et al. | |
| 2012/0293017 A1 * | 11/2012 | Lidsky | H02H 3/087 307/126 |

FOREIGN PATENT DOCUMENTS

| | | |
|---|---|---|
| JP | 2005-165716 | 6/2005 |
| KR | 10-1997-0022633 | 5/1997 |
| KR | 0164528 B | 3/1999 |

* cited by examiner

ELECTRONIC DEVICE POWER PROTECTION CIRCUITRY

This application is a continuation of U.S. non-provisional patent application Ser. No. 13/629,276 filed Sep. 27, 2012, which claims priority to both U.S. provisional patent application No. 61/660,634 filed Jun. 15, 2012, and U.S. provisional patent application No. 61/664,691 filed Jun. 26, 2012. U.S. non-provisional patent application Ser. No. 13/629,276 filed Sep. 27, 2012, U.S. provisional patent application No. 61/660,634 filed Jun. 15, 2012, U.S. provisional patent application No. 61/664,691 filed Jun. 26, 2012, are hereby incorporated by reference herein in their entireties.

BACKGROUND

This relates generally to electronic devices and, more particularly, to power protection circuitry for electronic devices.

Electronic devices such as cellular telephones, media players, tablet computers, and other devices are often coupled to accessories. For example, an accessory device may have a display, speakers, or other components that can be used by a host electronic device in playing media files or other content for a user.

During normal operation, the host device may supply power to the accessory. If the accessory is defective or poorly designed, the accessory may supply power to the host device rather than drawing power from the host device. This behavior, which may sometimes be referred to as back-powering, may cause damage to the host device.

It would therefore be desirable to be able to provide protection circuitry for preventing damage from back-powering when accessories are coupled to the electronic device.

SUMMARY

An accessory may potentially back-power a host electronic device. To prevent damage to the host electronic device, the electronic device may be provided with a protection circuit. The protection circuit may be used to block current flow between the accessory and the host device whenever a back-powering condition is detected.

The host electronic device may be coupled to the accessory electronic device by a power supply path. During normal operation, the host device may supply the accessory device with power over a power supply line. In some situations, the accessory may attempt to deliver power to the host device. This type of back-powering operation is undesirable and may be prevented by interposing a protection transistor in the power supply line. A current mirror may be formed using the protection transistor and an additional transistor. A biasing circuit may be used to maintain the drain of the additional transistor at substantially the same voltage as the drain of the protection transistor, thereby enhancing accuracy in the current mirror. For example, the biasing circuit may include mirror transistors formed in a cascode arrangement. The biasing circuit may be used to bias the current through the additional transistor to match a predetermined bias current. By biasing the current through the additional transistor to the predetermined bias current and using the cascode arrangement, variations associated with temperature may be mitigated.

The current mirror may produce a sense current that is proportional to the amount of current currently flowing through the protection transistor and the power supply line. A current-to-voltage amplifier may produce a sense voltage that is proportional to the sense current. If desired, the bias circuit may be configured so that the current-to-voltage amplifier produces a sense voltage that is proportional to the sense current minus the predetermined bias current. A control circuit may use a comparator to compare the sense voltage to a reference voltage.

The control circuit may turn on the protection transistor to allow the host device to power the accessory whenever the sense voltage is at a level indicating that power is flowing from the host to the accessory. The protection transistor may also be turned on so long as no more than an acceptably small amount of reverse current is presented on the power supply line. When a back-powering condition is detected, the control circuit may turn off the transistor to prevent current flow from the accessory into the host device over the power supply line.

The control circuit may detect severe back-powering conditions using a first comparator. The control circuit may detect moderate back-powering conditions of excessive duration using a second comparator and a detection circuit. The control circuit may turn off the protection transistor in response to either detection of a severe back-powering condition or a moderate back-powering condition of excessive duration.

A sink transistor may be coupled to the power supply line to divert back-power current away from power supply circuitry of the device. The sink transistor may be controlled by the control circuitry based on the sense voltage to sink an appropriate amount of back-current.

Further features of the invention, its nature and various advantages will be more apparent from the accompanying drawings and the following detailed description of the preferred embodiments.

DETAILED DESCRIPTION

Figure 1:
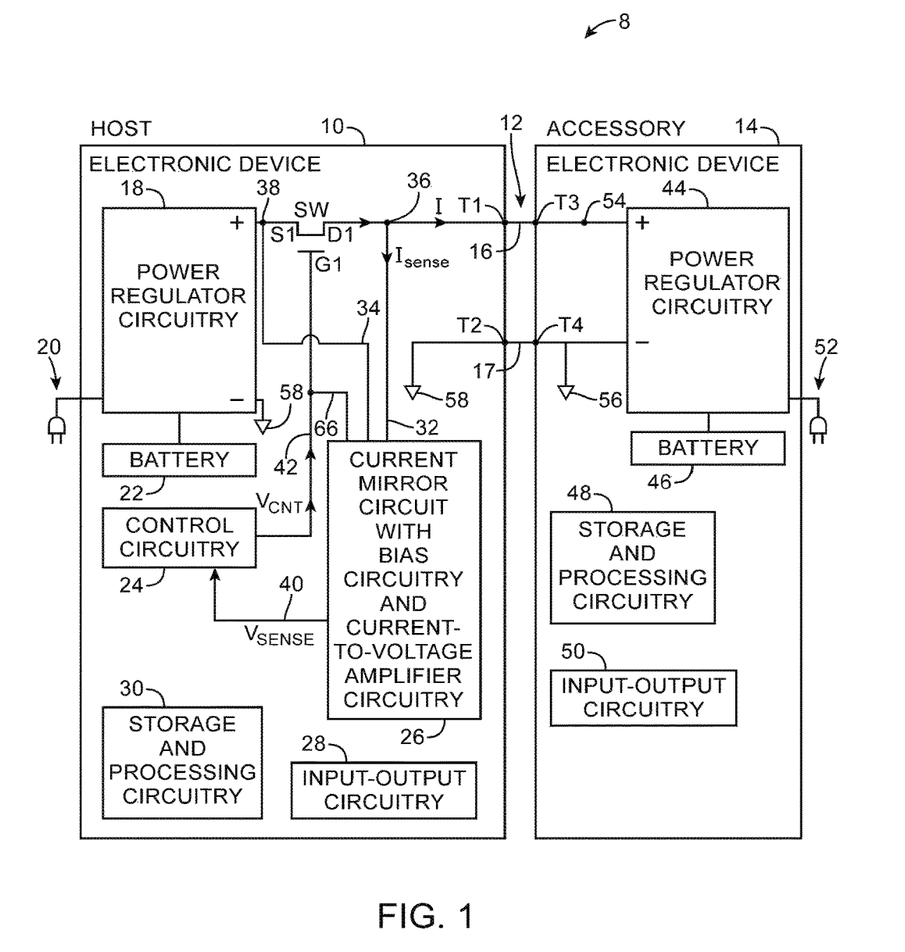
FIG. 1 is a diagram of a system in which a host electronic device is coupled to an accessory electronic device in accordance with an embodiment of the present invention.

An illustrative system containing an electronic device with protection circuitry is shown in FIG. 1. As shown in FIG. 1, system 8 may include a host device such as electronic device 10 and an accessory device such as electronic device 14 or other external equipment. Path 12 may be used to couple devices 10 and 14. Path 12 may include power lines such as positive power line 16 through which a positive power supply current flows and ground power line 17 through which a ground power supply current flows. Path 12 may also include analog and/or digital signals lines (e.g., a pair of data lines, etc.). When power is being delivered from host 10 to accessory 14, current I that flows through line 16 will be positive.

Device 10 may have an input-output port with input-output power supply terminals T1 and T2. Device 14 may have an input-output port with input-output power supply terminals T3 and T4. Terminals T1 and T3 may be positive power supply terminals. Terminals T2 and T4 may be ground power supply terminals. When device 10 and device 14 are coupled together, terminal T1 may be electrically connected to terminal T3 via line 16 and terminal T2 may be connected to terminal T4 via line 17. Conductive paths 16 and 17 may form part of a cable or may be formed by direct contact between terminals T1 and T2 and between terminals T3 and T4. Terminals T1 and T2 may be associated with contacts in a connector in device 10 (e.g., an input-output connector in an input-output port on device 10). Terminals T3 and T4 may be associated with contacts in a connector in device 14 (e.g., an input-output connector in an input-output port on device 10).

Electronic devices such as devices 10 and 14 of FIG. 1 may be cellular telephones, media players, other handheld portable devices, somewhat smaller portable devices such as wrist-watch devices, pendant devices, or other wearable or miniature devices, gaming equipment, tablet computers, notebook computers, desktop computers, televisions, computer monitors, computers integrated into computer displays, embedded equipment such as equipment in an automobile, equipment including speakers and/or a monitor for presenting sound and/or video to a user, or other electronic equipment. As an example, host electronic device 10 may be cellular telephone, media player, or computer and accessory electronic device 14 may be equipment that includes speakers for presenting audio to a user and/or a display for presenting video to a user. The audio and/or video content to be displayed may be provided to device 14 from device 10 over a data path associated with path 12.

Host 10 may include storage and processing circuitry 30 and input-output circuitry 28. Electronic device 14 may include storage and processing circuitry 48 and input-output circuitry 50. Storage and processing circuitry 30 and 48 may include one or more integrated circuits such as memory circuits, processors, and application-specific integrated circuits. Input-output circuitry 28 and input-output circuitry 50 may include user interface components such as buttons, speakers, microphones, displays, touch sensors, and other devices for gathering input or presenting output to a user. Input-output circuitry 28 may also include wired communications circuits, wireless communications circuitry, sensors, and other electronic device components.

Power may be supplied to devices 10 and 14 using alternating current (AC) line power from wall outlets or other sources of AC power (e.g., AC sources 20 and 52). Power may also be obtained using batteries such as batteries 22 and 46.

Power regulator circuitry 18 and 44 may be used in converting AC power from an AC source or battery power into a regulated source of direct current (DC) power for use by the electrical components of devices 10 and 14 (e.g., a positive voltage on a + terminal and a zero or ground voltage on a − terminal).

During normal operation, power regulator circuitry 18 of device 10 may provide a positive power supply voltage to node 38. Protection transistor SW (which serves as a protection switch) may normally be on (i.e., the switch formed by the transistor may be closed), so that the voltage on node 38 is conveyed to node 36. Positive signal line 16 may connect positive power supply voltage node 36 in device 10 to positive power supply voltage node 54 in device 14. Power supply ground line 17 may be used to couple ground 56 in device 14 to ground 58 in device 10.

When transistor SW is on during normal operation, host device 10 may supply power to accessory 14 via path 12. As a result, a positive current I may flow along line 16. In accessories without power sources, there is no risk of a back-powering condition. If, however, device 14 is faulty or poorly designed, power regulator circuitry 44 may attempt to deliver power to device 10 via path 12. In this type of situation, a negative value of current I may be generated on line 16.

To prevent damage to device 10, transistor SW may be turned off (i.e., switch SW may be opened) as soon as device 10 detects a back-powering condition. For example, transistor SW may be turned off to create an open circuit between drain D1 and source S1 at values of I below −5 mA or other suitable threshold value (i.e., when the magnitude of current I is above a given threshold and when the polarity of current I is negative).

Control circuitry 24 may be used to control the state of transistor SW by applying a control signal such as control voltage Vcnt to gate G1 of transistor SW via control line 42. When control circuitry 24 asserts control signal Vcnt, transistor SW may be turned on to allow power to flow from power regulator circuitry 18 to path 12. When control circuitry 24 deasserts control signal Vcnt, transistor SW may be turned off to block current flow from device 14 into device 10 and thereby protect device 10 from damage during a back-powering event.

Control circuitry 24 may use current sensing circuitry such as a current mirror circuit with bias circuitry and current-to-voltage amplifier circuitry (i.e., circuitry 26) to monitor the amount of current flowing through transistor SW. Circuitry 26 may be coupled to terminal 36 using path 32 and may be coupled to terminal 38 via path 34. Circuitry 26 may be coupled to the gate of transistor SW via path 66. During operation, the components of circuitry 26 may form a current mirror with transistor SW. The current mirror and associated circuitry of circuit 26 may facilitate monitoring of current I.

As current I passes through transistor SW, a proportional voltage drop Vdrop develops across terminals 36 and 38. Because transistor SW is on, the value of Vdrop may be relatively small, making measures of I based on Vdrop challenging and potentially vulnerable to noise on line 16.

Accordingly, device 10 preferably includes a current mirror that is formed using transistor SW and circuitry 26. The current mirror circuitry of device 10 and associated current-to-voltage amplifier circuitry may be used to convert a sensed current Isense, which is a small current that is proportional to current I, to a voltage Vsense that is proportional to current I. Control circuit 24 may receive signal voltage Vsense from circuitry 26 via path 40.

Figure 2:
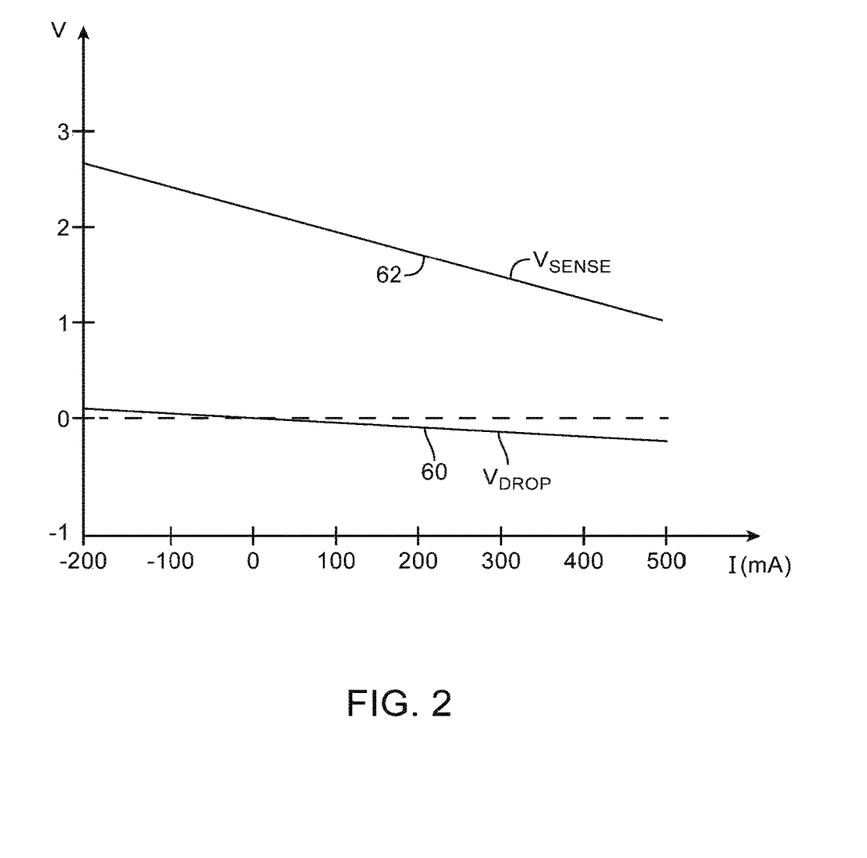
FIG. 2 is graph showing signals that may be measured in an electronic device to detect back-powering conditions in accordance with an embodiment of the present invention.

As shown by curve 60 of FIG. 2, the magnitude of Vdrop over a range of possible operating currents (e.g., from −200 mA to 500 mA in the example of FIG. 2) may be relatively small and may not vary significantly as a function of current I. As shown by line 62 of FIG. 2, the magnitude of Vsense may be significantly larger (e.g., 10 to 100 times larger, as an example). Voltage Vsense may also change significantly as a function of current I. Because Vsense is larger than Vdrop and, more particularly, because the change in Vsense for a given change in current I (i.e., the slope of line 62) is significantly greater than the change in Vdrop for the same given change in current I (i.e., the slope of line 62), the use of Vsense by control circuitry 24 in making decisions regarding the state of transistor SW may improve accuracy.

Figure 3:
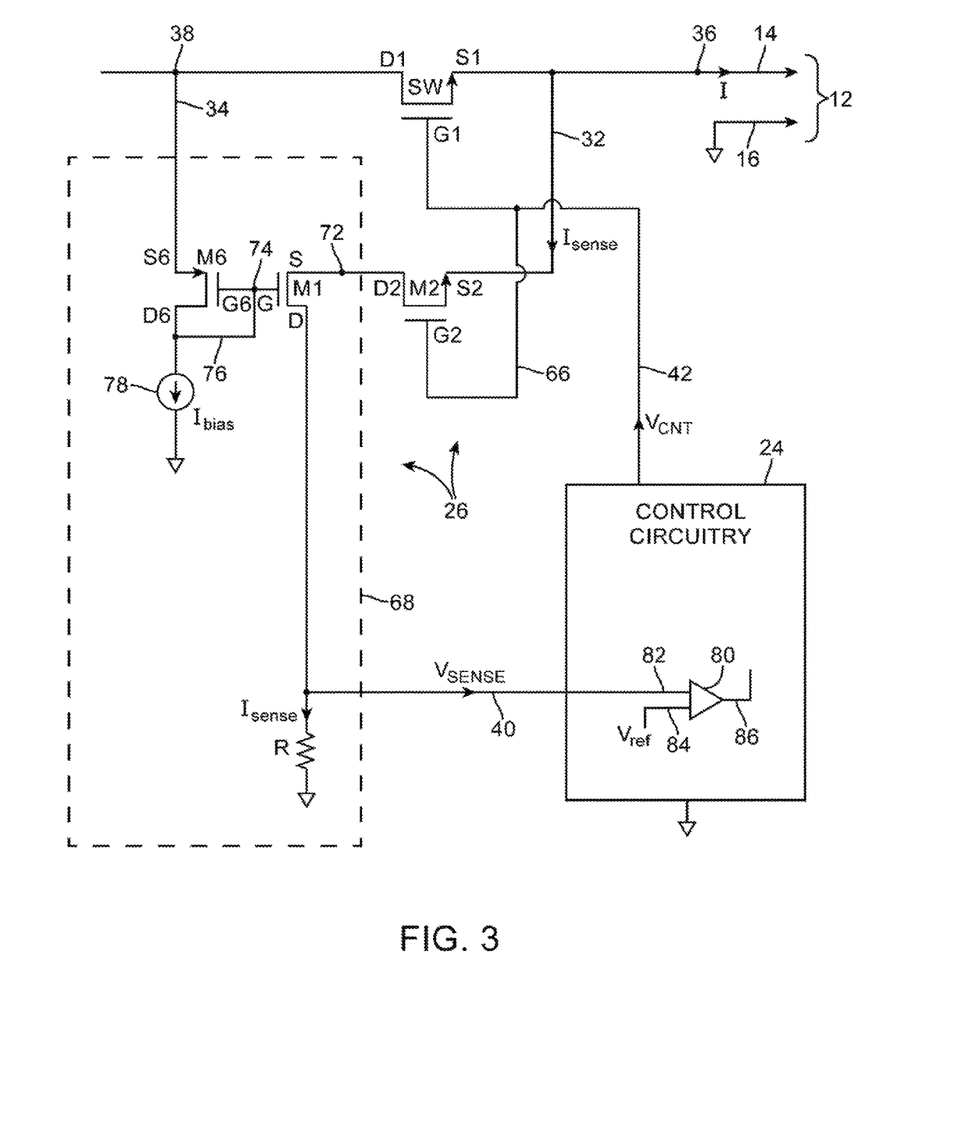
FIG. 3 is a circuit diagram of illustrative protection circuitry in accordance with an embodiment of the present invention.

FIG. 3 is a circuit diagram showing illustrative components that may be used in implementing circuitry 26 and circuitry 24. As shown in FIG. 3, circuitry 26 may include a transistor such as transistor M2 that is configured to form a current mirror with transistor SW. Circuitry 26 may also include bias circuitry and current-to-voltage amplifier circuitry 68. Bias and current-to-voltage amplifier circuitry 68 may include transistors such as transistors M1 and M6 that are configured to drive sense current Isense across resistor R to produce voltage Vsense on line 40.

Transistor SW may have source terminal S1, drain terminal D1, and gate terminal G1. Transistor M2 may have source terminal S2, drain terminal D2, and gate terminal G2. For optimum accuracy of the current mirror formed by transistors SW and M2, it is desirable for source S1 of transistor SW to have the same voltage as source S2 of transistor M2 and for gate G1 of transistor SW to have the same voltage as gate G2 of transistor M2. This may be accomplished by using line 32 to electrically connect source S1 and source S2 and by using line 66 to electrically connect gate G1 and gate G2.

Drains D1 and D2 should also be maintained at the same voltage to ensure accurate operation of the current mirror. Drains D1 and D2 of transistors SW and M2 are not shorted together. Nevertheless, the bias circuitry of circuitry 68 may be used to match the voltage at node 72 (and therefore drain D2) to the voltage at drain D1. By using circuitry 68 to force the voltage level on drain D2 towards the voltage level on drain D1, the current mirror formed from transistors SW and M2 may produce a sense current Isense on line 32 that accurately tracks the value of current I on line 14. In a typical arrangement, transistors M2 and SW may be configured so that Isense is a small fraction of I (e.g., so that Isense will be equal to $10^{-6}*I$ or other suitable fraction of I). The magnitude of the current Isense that is drawn through path 32 is therefore negligible and can be ignored, so that the current (I) passing through line 14 will be substantially equal to the magnitude of the current passing through transistor SW.

Transistors M1 and M6 may form a common gate amplifier that is used in converting current Isense into a voltage Vsense on line 40. As shown in FIG. 3, transistor M6 is diode connected (i.e., drain D6 and gate G6 are connected by path 76). Current source 78 produces a biasing current Ibias that sets the DC voltage on drain D6 (node 74). Node 74 is one Vgs (i.e., one gate-to-source voltage of transistor M6 at current Ibias) below the voltage at node 38. The voltage on node 74 is provided to the gate G of transistor M1 and sets the operating point of transistor M1. The voltage of source terminal S of transistor M1 (i.e., node 72 and drain D2 of transistor M2) roughly tracks the voltage at node 38 (i.e., drain D1 of transistor SW), because the voltage at node 72 is one Vgs (of M1) above the voltage of node 74 and because the voltage on node 74 is one Vgs (of M6) below the voltage on node 38. As a result of this biasing circuit operation, the voltage on drain D2 substantially matches the voltage on drain D1, helping to ensure accurate current mirror operation.

The current Isense in transistor M2 is proportional to the current of transistor SW because M2 and SW form a current mirror. The current Isense flows through sense resistor R and produces voltage drop Vsense on line 40. Control circuitry 24 may have a comparator such as comparator 80. Comparator 80 may compare the voltage Vsense on input 82 to a reference voltage Vref on input 84 and may produce a corresponding binary output signal on line 86 that is reflective of whether Vsense is above or below Vref. Using the state of the signal on line 86, control circuitry 24 can assert or deassert control signal Vcnt on line 42.

The value of reference voltage Vref may be set to a value that corresponds to a desired reverse current threshold for path 14. As an example, Vref may be set to a level corresponding to a −5 mA value for current I. At values of I above −5 mA and below 0, the amount of current flowing into device 10 is minimal, so that device 10 can satisfactorily sink the reverse current I without incurring damage to its internal components. At values of I above 0, no back-powering condition is present and device 10 and accessory 14 operate normally. Under both of these situations, control circuitry 24 can assert the Vcnt signal on line 42 to ensure that transistor SW is on. With transistor SW on, nodes 38 and 36 will be shorted together and device 10 and device 14 can be operated in a mode in which device 10 powers device 14 over path 12.

To help ensure accurate performance, the reference voltage Vref may be calibrated. For example, the value of Vref may be set to a value that removes internal offset from the comparator and ensures that the control circuit will be triggered at a desired value of current I (e.g., −5 mA or other suitable level).

At values of I below the threshold current value of −5 mA (in this example), the output on line 86 will toggle (invert). Control circuitry 24 will respond accordingly by deasserting control signal Vcnt to turn off transistor SW. With transistor SW turned off, back-powering current flowing from device 14 to device 10 will be blocked, thereby preventing damage to the circuitry of device 10.

The accuracy of the common-gate amplifier formed from transistors M1 and M6 may be enhanced by using transistors that are matched to each other. Transistors M2 and SW may have strengths (W/L values) with a ratio (K value) of about $10^{-2}$ to $10^{-4}$ or other suitable ratio. As an example, transistor M2 may have a strength of about one thousandth the strength of transistor SW.

Figure 4:
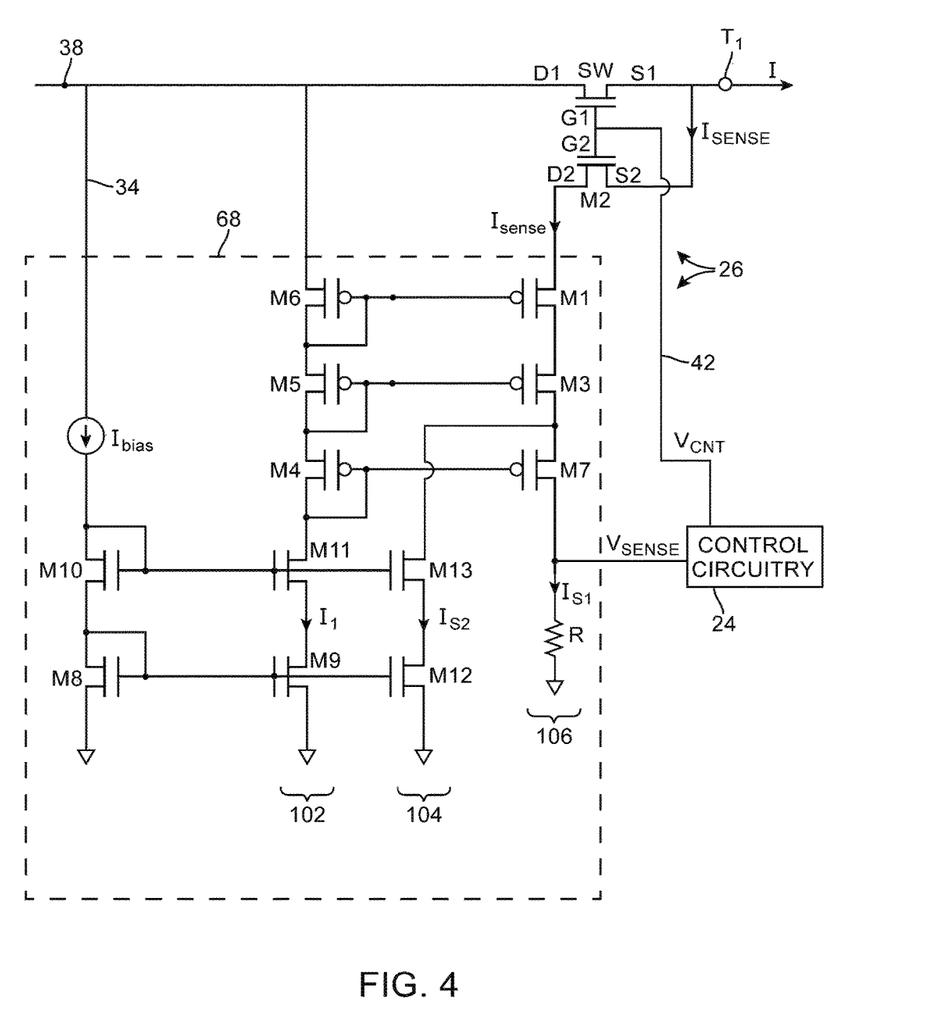
FIG. 4 is a circuit diagram of illustrative protection circuitry having a cascode mirror arrangement in accordance with an embodiment of the present invention.

Bias circuitry used to help detect back-powering conditions may be provided with cascode circuitry for improved circuit biasing. FIG. 4 is an illustrative circuit diagram showing how bias circuitry and current-to-voltage circuitry 68 may form a cascode arrangement. Circuitry 68 may include a transistor M10. As shown in FIG. 4, bias current Ibias may be mirrored to circuit branches 102 and 104 by transistors M8, M9, and M12 (e.g., transistors M8 and M9 may form a current mirror for circuit branch 102, whereas transistors M8 and M12 may form a current mirror for circuit branch 104).

Transistors M11 and M13 may serve as cascode transistors that help to isolate current mirror transistors M9 and M12 from variations associated with differing drain voltages. For example, transistor M11 may help match the drain-source voltage of transistor M9 to transistor M8, which tends to isolate the operation of transistor M9 from variations in current Isense (e.g., because the drain-source and gate-source voltages of transistor M9 are matched to the drain-source and gate-source voltages of transistor M8). Transistors M3, M5, M4, and M7 may serve as a cascode arrangement that helps to match the voltage at drain D2 of transistor M2 with the voltage at drain D1 of transistor SW.

Current Isense that is mirrored from transistor SW by transistor M2 may be provided to transistors M1 and M3. Current Isense may be partitioned into currents Is2 and Is1. Current Is2 may be determined by the amount of current sourced by current mirror transistor M12 (e.g., current Is2 may be equivalent to Ibias and current I1). Current Is1 may reflect any remaining current from Isense. For example, for Isense currents that are greater than current Is2 (e.g., greater than Ibias), current Is1 may reflect the difference in current between Isense and Is2. As another example, for currents Isense that are insufficient (e.g., less than Ibias), a minimal amount of current may flow through resistor R. Current Is1 may be routed through circuit branch 106 and amplified by resistor R to produce voltage Vsense.

Figure 5:
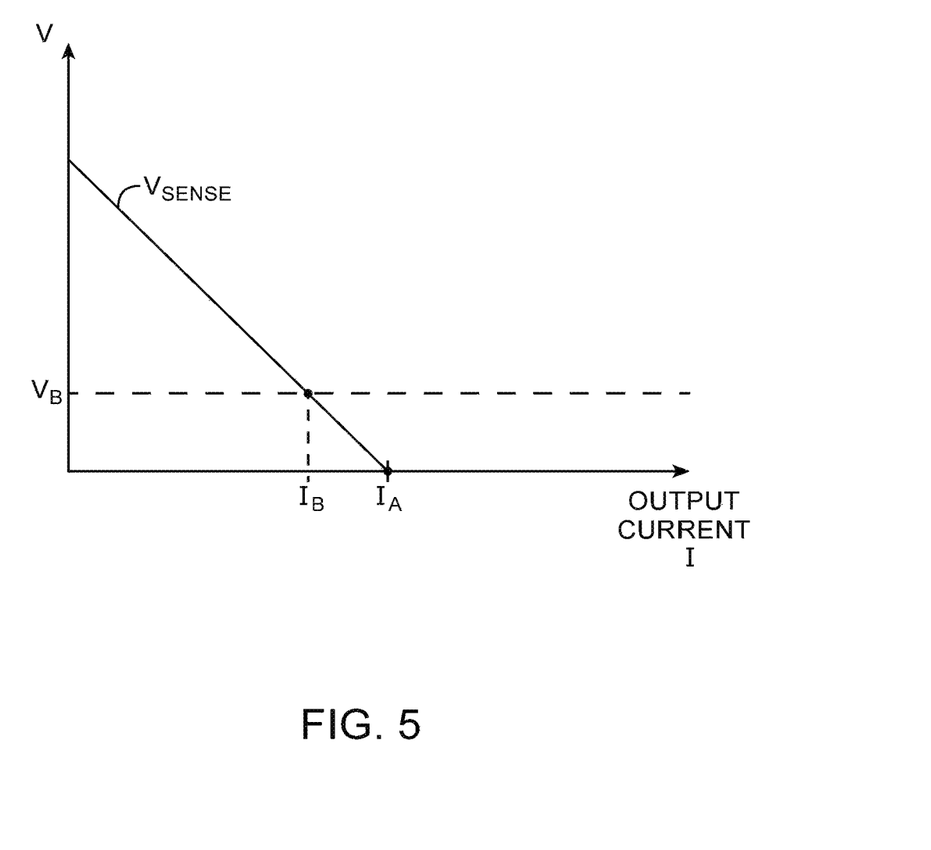
FIG. 5 is a diagram showing how sensed voltage may depend on output current for the circuitry of FIG. 4.

FIG. 5 is an illustrative diagram showing how voltage Vsense produced by the circuit of FIG. 4 varies with output current I (e.g., output current provided to an accessory device). As shown in FIG. 5, at output current Ia, Vsense may be zero volts. The value of Ia may reflect the difference between bias currents I1 and Is2 of circuit branches 102 and 104. For example, if transistors M9 and M12 are matched so that I1 is equal to Is2, then Ia may be minimal (e.g., Ia may be a value between −2 mA and 0 mA such as −1.5 mA). In other words, Vsense may be zero volts when current Isense is equal to current Is2 and no current passes through resistor R. At device output currents that are greater than Ia voltage Vsense may remain at zero volts.

Control circuitry 24 may be configured to disable transistor SW in response to determining that voltage Vsense exceeds threshold voltage Vb (e.g., when the magnitude of back-power current exceeds the magnitude of current Ib). Threshold voltage Vb may be selected based on the capability of power regulator circuitry 18 to withstand back-power currents with magnitudes up to the magnitude of Ib.

Biasing circuitry 68 of FIG. 4 helps to ensure that the voltage at drain D1 of transistor SW and drain D2 at transistor M2 are matched during back-powering threshold conditions. At output current Ia (e.g., minimal output current levels), current Isense is substantially the same as current IS2 and the cascode mirror structure formed from transistors M1, M3, M4, M5, M6, M7, M11, M9, M13, and M12 helps to ensure that the voltage at drain D1 of transistor SW is approximately equal to the voltage at drain D2 of transistor M2.

Figure 6:
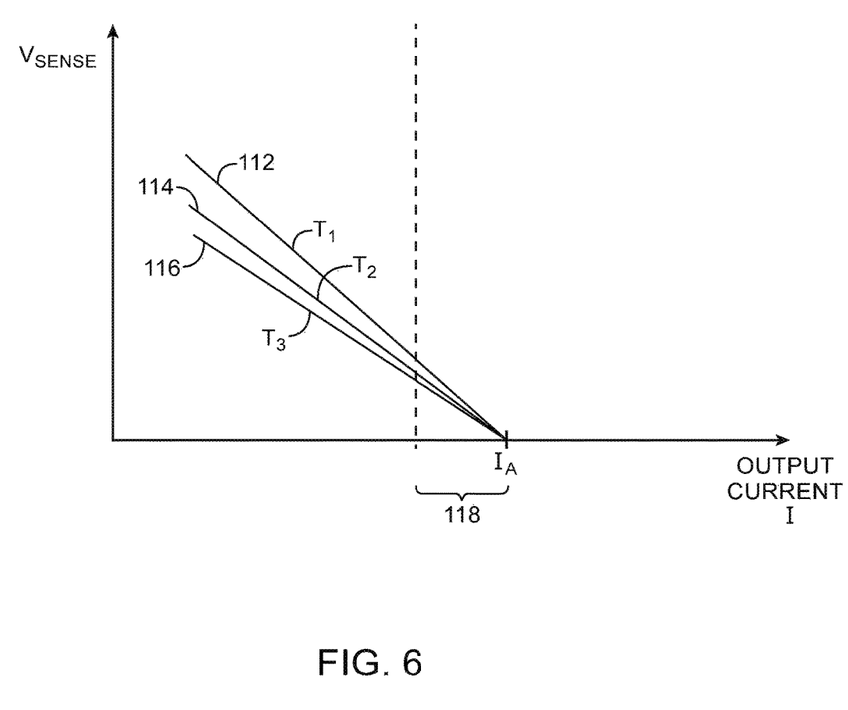
FIG. 6 is a diagram showing how the circuitry of FIG. 4 may help mitigate variations in sensed voltage associated with temperature in accordance with an embodiment of the present invention.

By matching the voltages at D1 and D2, biasing circuitry 68 may help to protect against temperature variations. FIG. 6 is an illustrative diagram showing how variations in Vsense that are associated with changes in temperature may be mitigated by biasing circuitry 68. As shown in FIG. 6, line 112 may correspond to Vsense produced at a first temperature T1, line 114 may correspond to Vsense produced at a second temperature T2, and line 116 may correspond to Vsense produced at a third temperature T3. At output currents within window 118 surrounding current Ia, lines 112, 114, and 116 may have minimal differences (e.g., Vsense may be insensitive to temperature variations within window 118).

Figure 7:
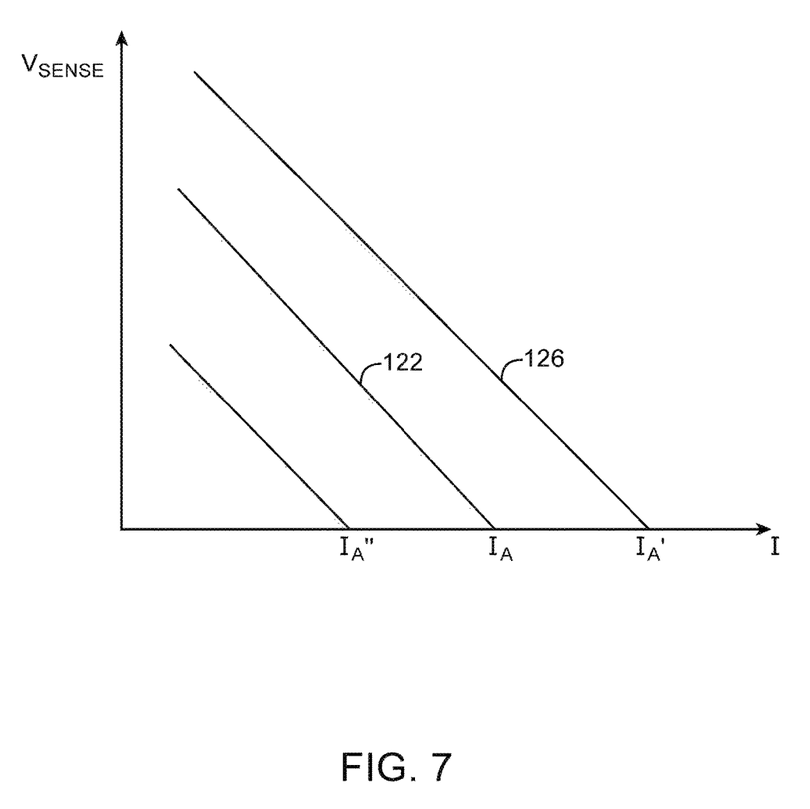
FIG. 7 is a diagram showing how the circuitry of FIG. 4 may be adjusted to different bias settings in accordance with an embodiment of the present invention.

If desired, threshold current Ia at which voltage Vsense is produced may be adjusted. Threshold current Ia may be adjusted by adjusting the difference between current I1 of circuit branch 102 and current Is2 of circuit branch 104. For example, the width to length ratio (W/L) of transistor M9 relative to W/L of transistor may be adjusted to control the difference between current I1 and current Is2. To increase current Is2, W/L of transistor M12 may be increased relative to transistor M9 (e.g., by increasing W of transistor M12 or decreasing W of transistor M9). FIG. 7 is an illustrative diagram showing how threshold current Ia may be controlled by adjusting the sizing of current mirror transistors M9 and M12.

As shown in FIG. 7, line 122 may correspond to threshold current Ia. The threshold current of bias circuitry and current-to-voltage amplifier circuitry 26 may be increased to threshold current Ia' by decreasing the ratio of W/L between transistors M12 and M9. For example, the ratio of W/L of transistor M12 may be decreased relative to W/L of transistor M9. In this scenario, current Is2 through transistor M12 may be decreased relative to current I1 through transistor M9, which increases the amount of current provided to sense resistor R for any given output current I (e.g., the sensed voltage of line 126 may be greater than the sensed voltage of line 122 for any given output current I). Similarly, the threshold current may be decreased to Ia'' by increasing the ratio of W/L of M12 to W/L of M9.

Figure 8:
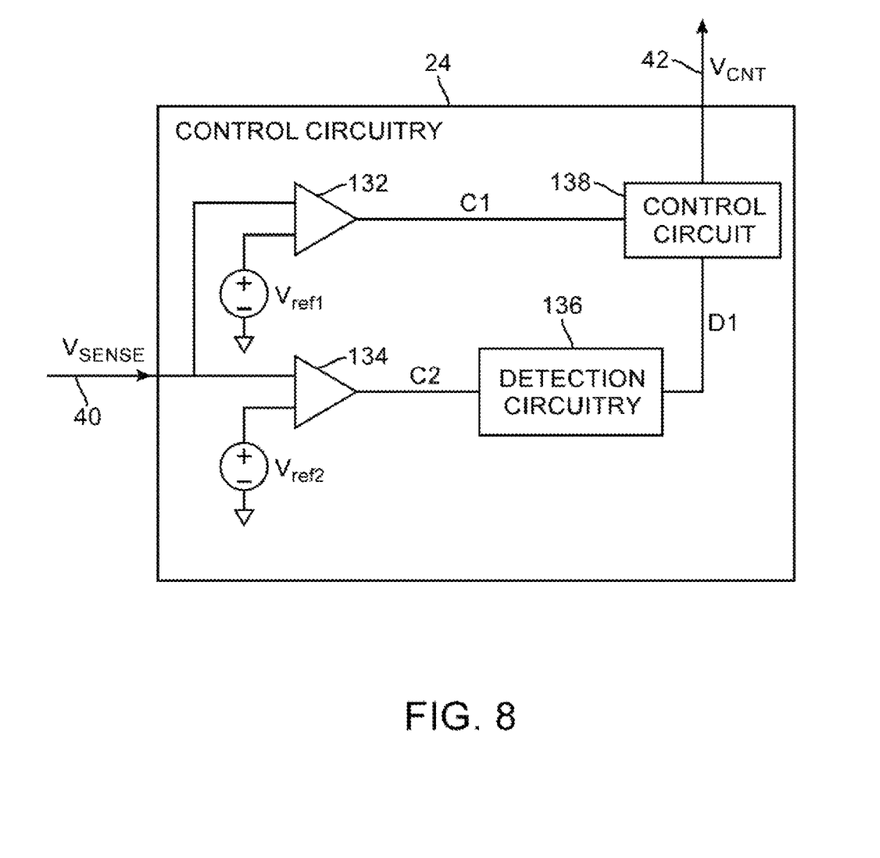
FIG. 8 is a diagram of illustrative control circuitry that may detect severe and moderate back-powering conditions in accordance with an embodiment of the present invention.

FIG. 8 is an illustrative diagram of control circuitry 24 that may be provided to generate control signal Vcnt in response to a sensed voltage Vsense produced by circuitry 26. As shown in FIG. 8, control circuitry 24 may include comparators 132 and 134 that receive voltage Vsense and compare Vsense to respective reference voltages Vref1 and Vref2. Vref1 may be a voltage suitable for detecting large voltages associated with severe back-power conditions (e.g., C1 may be asserted when Vsense is larger than Vref1). Vref2 may be a voltage suitable for detecting smaller voltages associated with moderate back-power conditions (e.g., C2 may be asserted when Vsense is larger than Vref2). As an example, Vref1 may be the voltage sensed by circuitry 26 when Isense is approximately 200 mA, whereas Vref2 may be the voltage sensed by circuitry 26 when Isense is approximately 5 mA. This example is merely illustrative. Vref1 and Vref2 may be any desired voltages for detecting back-power conditions.

Detection circuitry 136 may receive signal C2 from comparator 134 and detect when C2 has been continuously asserted for longer than a predetermined threshold of time (e.g., 10 uS, 100 uS, or any other desired threshold duration). For example, when the output of comparator 134 has been continuously asserted for longer than 10 uS, detection circuitry 136 may assert detection signal D1 provided to control circuit 138. This example is merely illustrative. Detection circuitry 136 may be configured with any desired threshold value of time. For example, the threshold value of time may be determined based on the capabilities of regulator circuitry 18 of device 10 to withstand a moderate amount of back-power current from electronic device 14.

Figure 9:
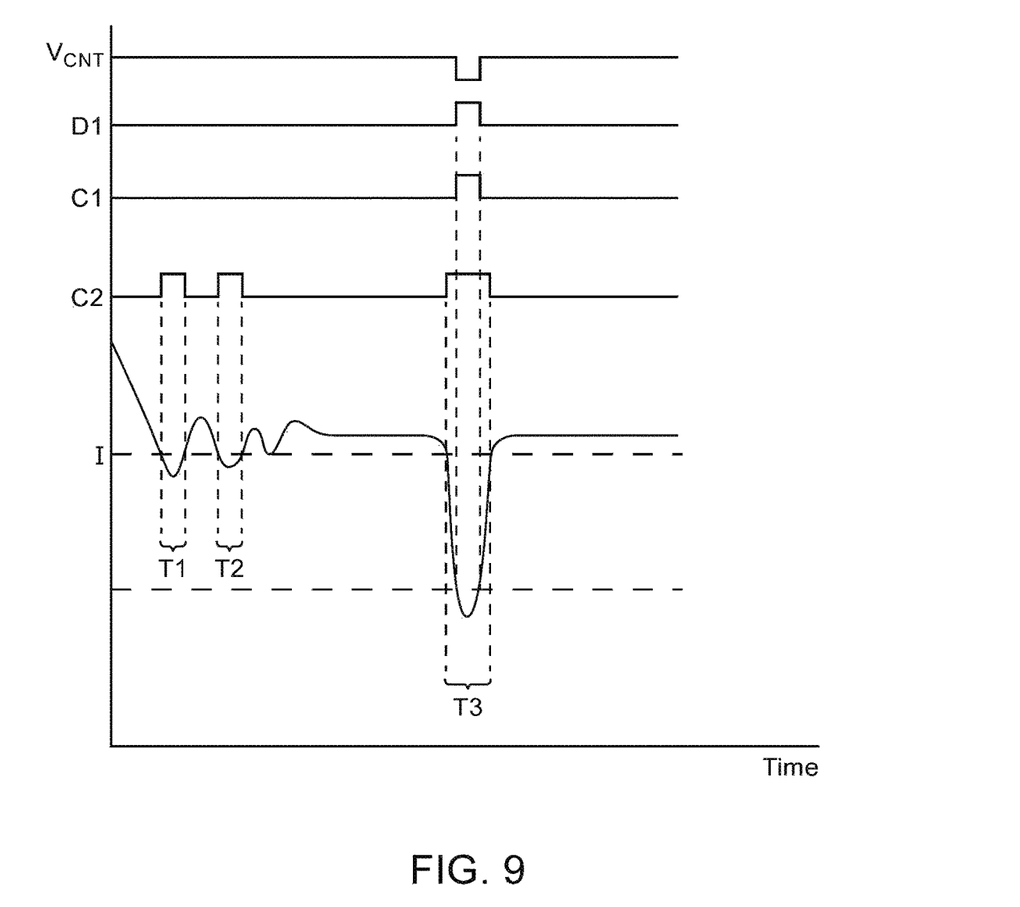
FIG. 9 is a timing diagram showing how the control circuitry of FIG. 8 may response to a severe back-powering condition in accordance with an embodiment of the present invention.

Detection circuitry 136 may include digital and/or analog-based detection circuits. For example, detection circuitry 136 may include a clock-based counter that detects how many clock cycles the output of comparator 134 has been continuously asserted for. In this scenario, detection circuitry 136 may assert detection signal D1 in response to determining that the counter has reached a predetermined value (e.g., a counter threshold). This example is merely illustrative. If desired, detection circuitry 136 may include state machine-based detection circuits, RC-based detection circuits, or any desired circuits that detect how long the output of comparator 134 has been continuously asserted FIG. 9 is an illustrative diagram showing the operation of control circuitry 24 during back-powering conditions. As shown in FIG. 9, device output current I may initially oscillate (e.g., power supply path inductance associated with paths 16 and 17 may cause ringing when power is supplied by host 10 to accessory 14). The initial ringing may have sufficient magnitude to trigger comparator 134 to assert signal C2 during times T1 and T2 (e.g., a corresponding Vsense voltage having a magnitude greater than Vref2 may be produced during times T1 and T2). However, detection circuitry 136 may determine that times T1 and T2 are not of sufficient duration, and detection signal D1 may remain deasserted.

During time T3, a severe back-powering condition may occur in which sufficient back-power is received by device 10 to trigger comparator 132 (e.g., current I may be sufficiently negative for circuitry 26 to produce a Vsense voltage greater than Vref1). In this scenario, control circuit 138 may disable transistor SW to protect device 10 from the back-powering condition (e.g., by deasserting Vcnt).

Figure 10:
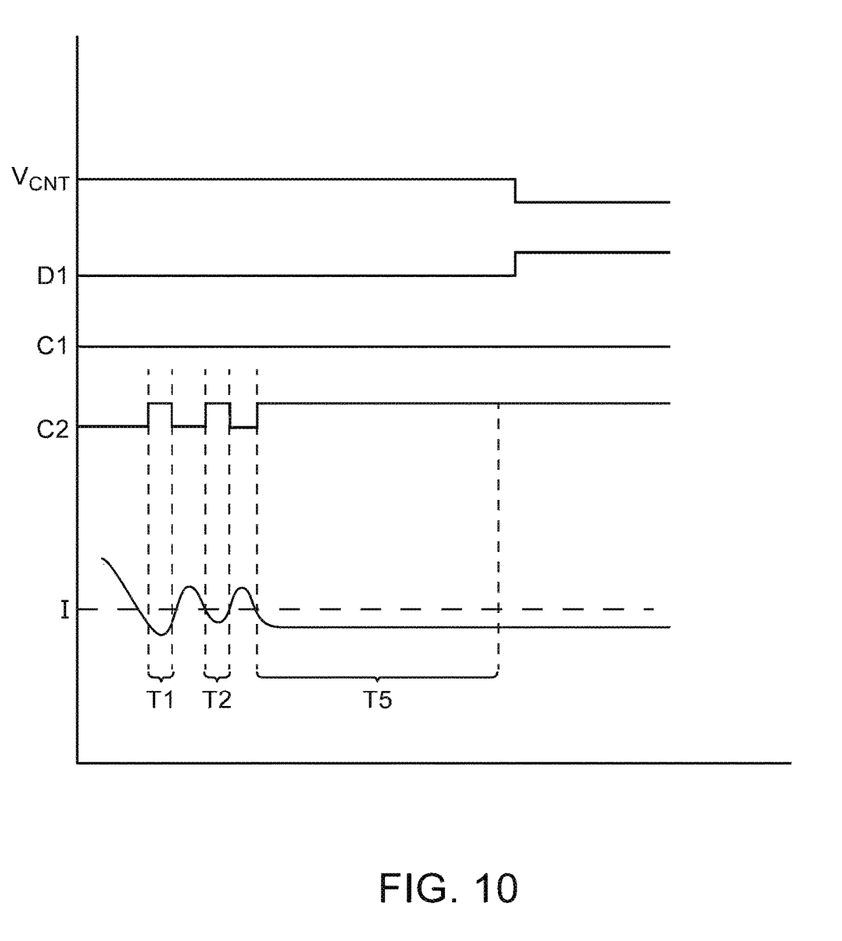
FIG. 10 is a timing diagram showing how the control circuitry of FIG. 8 may response to a moderate back-powering condition in accordance with an embodiment of the present invention.

FIG. 10 is an illustrative diagram showing the operation of control circuitry 24 during moderate back-powering conditions. As shown in FIG. 10, device output current I may stabilize after initial ringing to a negative current of moderate magnitude (e.g., the amount of back-power current after initial ringing may be sufficient to trigger comparator 134 to assert signal C2 during time period T5 but may be insufficient to trigger comparator 132. In the example of FIG. 10, detection circuitry 136 may assert detection signal D1 at the end of time period T5 (e.g., because signal C2 has been continuously asserted for a longer than a predetermined threshold). Control circuit 138 may de-assert Vcnt in response to assertion of signal D1.

Figure 11:
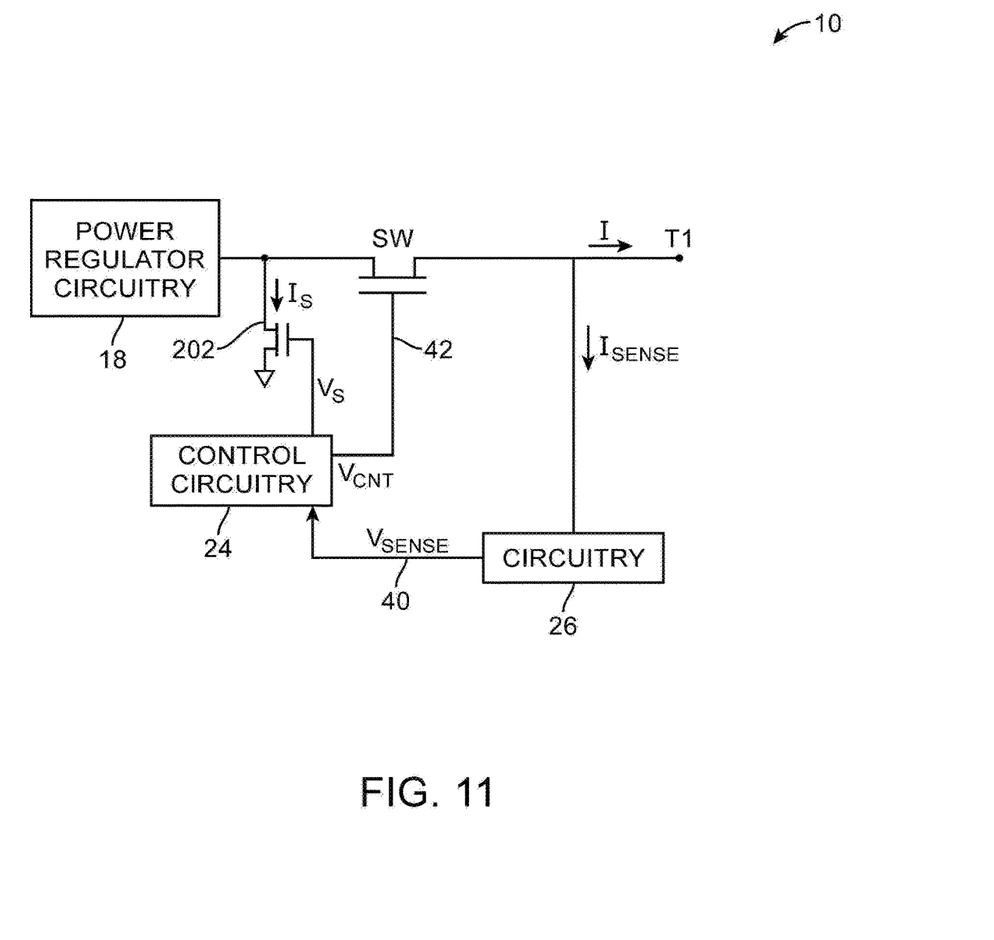
FIG. 11 is a diagram of illustrative protection circuitry having a sink transistor in accordance with an embodiment of the present invention.

FIG. 11 is an illustrative diagram showing how control circuitry 24 may be used to control a sink transistor 202 by providing a control signal Vs to the gate of sink transistor 202. Control signal Vs may be determined based on voltage Vsense provided by current-to-voltage amplifier circuitry 26. During back-power conditions, control circuitry 24 may control sink current Is through transistor 202 using control signal Vs to divert back-power current away from power regulator circuitry 18.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of operating a first cellular telephone that is coupled to a second cellular telephone over a connection, the method comprising:
   with the first cellular telephone, delivering power to the second cellular telephone over the connection;
   with the first cellular telephone, determining whether power is being transferred from the second cellular telephone to the first cellular telephone over the connection; and
   with the first cellular telephone, halting the delivery of power to the second cellular telephone in response to determining that power is being transferred from the second cellular telephone to the first cellular telephone over the connection.

2. The method defined in claim 1, further comprising:
   with the first cellular telephone, transmitting data to the second cellular telephone over the connection.

3. The method defined in claim 1, wherein the connection comprises a power line and a data line, and wherein delivering power to the second cellular telephone over the connection comprises:
   delivering power to the second cellular telephone over the power line.

4. The method defined in claim 3, wherein halting the delivery of power to the second cellular telephone comprises:
   at the first cellular telephone, disconnecting the power line from the second cellular telephone while maintaining the connection between the first cellular telephone and the second cellular telephone.

5. The method defined in claim 4, wherein disconnecting the power line from the second cellular telephone comprises:
   with control circuitry on the first cellular telephone, turning off a transistor in the first cellular telephone, wherein the transistor is interposed on the power line.

6. The method defined in claim 5, wherein turning off the transistor comprises:
   with the control circuitry, deasserting a control signal provided to a gate terminal of the transistor interposed on the power line.

7. The method defined in claim 1, wherein determining whether power is being transferred from the second cellular telephone to the first cellular telephone over the connection comprises:
   determining whether the second cellular telephone has delivered power to the first cellular telephone for a duration that exceeds a predetermined threshold duration.

8. The method defined in claim 1, wherein determining whether power is being transferred from the second cellular telephone to the first cellular telephone over the connection comprises:
   determining whether the second cellular telephone has delivered an amount of power to the first cellular telephone that exceeds a predetermined threshold amount of power.

9. The method defined in claim 1, the method further comprising:
   with control circuitry, diverting power delivered to the first cellular telephone over a path that is separate from the connection.

10. The method defined in claim 9, wherein diverting the power delivered to the first cellular telephone over the path comprises:
    providing a control signal to a sink transistor in response to detecting that the second cellular telephone is delivering power to the first cellular telephone over the connection.

11. A method of operating an electronic device, the method comprising:
    with the electronic device, delivering power to an external accessory device over a cable having a plurality of conductive paths;
    with the electronic device, identifying an amount of current received by the electronic device from the external accessory device over the cable;
    with the electronic device, determining whether the amount of current exceeds a threshold current; and with the electronic device, breaking a given conductive path of the plurality of conductive paths in response to determining that the amount of current exceeds the threshold current.

12. The method defined in claim 11, wherein the given conductive path comprises a first conductive path, the method further comprising:
with the electronic device, transmitting data over a second conductive path of the plurality of conductive paths.

13. The method defined in claim 11, wherein the given conductive path comprises a power line, wherein another conductive path of the plurality of conductive paths comprises a data line, and wherein delivering power to the external accessory device over the cable comprises:
delivering power over the power line.

14. The method defined in claim 11, wherein breaking the given conductive path comprises:
turning off a transistor interposed on the given conductive path.

15. The method defined in claim 11, further comprising:
in response to determining that the amount of current provided to the electronic device by the external accessory device over the cable exceeds the threshold current, diverting current from the given conductive path through a sink transistor.

16. A method of operating an electronic device, the method comprising:
with the electronic device, delivering power to an accessory device over a cable having a plurality of conductive paths;
with the electronic device, identifying a duration of time during which current is received by the electronic device from the accessory device over the cable;
with the electronic device, determining whether the duration of time exceeds a threshold duration; and
with the electronic device, electrically disconnecting a given conductive path of the plurality of conductive paths from the accessory device in response to determining that the duration of time exceeds the threshold duration.

17. The method defined in claim 16, wherein the given conductive path comprises a first conductive path, the method further comprising:
with the electronic device, transmitting data over a second conductive path of the plurality of conductive paths.

18. The method defined in claim 16, wherein the given conductive path comprises a power line, wherein another conductive path of the plurality of conductive paths comprises a data line, and wherein delivering power to the accessory device over the cable comprises:
delivering power over the power line.

19. The method defined in claim 16, wherein electrically disconnecting the given conductive path to the accessory device comprises:
turning off a transistor interposed on the given conductive path.

20. The method defined in claim 16, further comprising:
in response to determining that the duration of time exceeds the threshold duration, diverting current from the given conductive path through a sink transistor.

* * * * *